United States Patent
Chien

(10) Patent No.: US 6,970,768 B2
(45) Date of Patent: Nov. 29, 2005

(54) DYNAMIC MATERIAL PICKING METHOD

(75) Inventor: Chih-Hung Chien, Taoyuan (TW)

(73) Assignee: Mitac International Corp., Hsinchu (TW)

( * ) Notice: Subject to any disclaimer, the term of this patent is extended or adjusted under 35 U.S.C. 154(b) by 55 days.

(21) Appl. No.: 10/654,469

(22) Filed: Sep. 4, 2003

(65) Prior Publication Data

US 2005/0055129 A1    Mar. 10, 2005

(51) Int. Cl.$^7$ .............. G06F 7/00; G05B 15/00; B65G 1/00; B65G 65/00
(52) U.S. Cl. .............. 700/216; 700/213; 700/83; 414/273
(58) Field of Search .............. 700/83, 84, 213, 700/214, 216; 414/266, 267, 273; 235/380, 235/381, 383

(56) References Cited

U.S. PATENT DOCUMENTS

| | | | | |
|---|---|---|---|---|
| 5,565,858 A | * | 10/1996 | Guthrie | 235/385 |
| 6,056,199 A | * | 5/2000 | Wiklof et al. | 235/462.45 |
| 6,076,023 A | * | 6/2000 | Sato | 700/214 |
| 6,711,458 B1 | * | 3/2004 | Kofoed | 700/213 |

* cited by examiner

*Primary Examiner*—Gene O. Crawford
(74) *Attorney, Agent, or Firm*—Birch, Stewart, Kolasch & Birch, LLP

(57) ABSTRACT

A dynamic material picking method for a warehouse system. The original materials picking list can be divided effectively and be combined or assigned as a new materials picking list. The picking operation is adjustable in response to any new order such that the loading of the picking staff is down and the job assignments are optimized.

3 Claims, 3 Drawing Sheets

DYNAMIC MATERIAL PICKING METHOD

BACKGROUND OF THE INVENTION

1. Field of Invention

The invention relates to materials picking method, and more particularly a dynamic method for assigning materials picking operations instantly to achieve the optimal staff assignments.

2. Related Art

Most companies employ an Automated Storage/Retrieval System (As/RS) to manage the goods and materials in their warehouses, owing to the small area and crowded population of the world and diversified needs of small quantities of materials. The basic operation of the AS/RS is very simple. There are not many species of goods being stored. The storage and shipment form are categorized into large quantities. The shipment is based on totes. Therefore, there is no need to plan the picking mode for the shipment operation. We can almost say in this way that the main function of AS/RS is to focus on storage. But, when the AS/RS is installed in smaller distribution centers with diverse needs that must be met immediately, problems easily occur in the storing and picking operations.

Much research has been devoted to the study of automated warehouses: their design principles and architecture classifications. Only a few attempts have been made to examine materials picking together with automated warehouse systems. The operation time of materials picking occupies more than ⅓ of the whole operation time of a distribution center. Most the operation systems usually adopt fixed materials picking lists to perform picking operations. For the dynamic storage management of a warehouse, or the large variety of loading of picking operations, the job assignment is not easily optimized. Once an order is made, or the picking personnel is assigned according to the loading job at that time, the picking operation cannot be adjusted in response to new orders. This results in choosing only one order. Thus resources cannot be arranged adequately.

Therefore, a method for solving the above-mentioned problems is required such that the materials picking operations can be effectively performed and the assignments of the picking staff can be optimized to improve service quality.

SUMMARY OF THE INVENTION

The main object of the invention is to provide a dynamic materials picking method for solving the above-mentioned problems. The original materials picking list can be disengaged effectively and combined or assigned as a new materials picking list. The new list can be reassigned at any time in response to any new order. Thus, the job loading of every picking staff could be quite equal to optimize the job assignment.

The main flow of the dynamic materials picking method disclosed in the invention starts with generating a new picking list by the system. Each new picking list is generated on the basis of available personnel, the waiting quantity of picking, the pre-defined electrical path by the system, the minimum job unit, and the minimum picking area. After the picking list is generated, the system sends new picking data according to instructions such that the picking personnel obtain the picking data from the terminal. After the picking operation is completed, the system updates the warehouse data and assures the loading of the warehouse system.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE INVENTION

Figure 1:
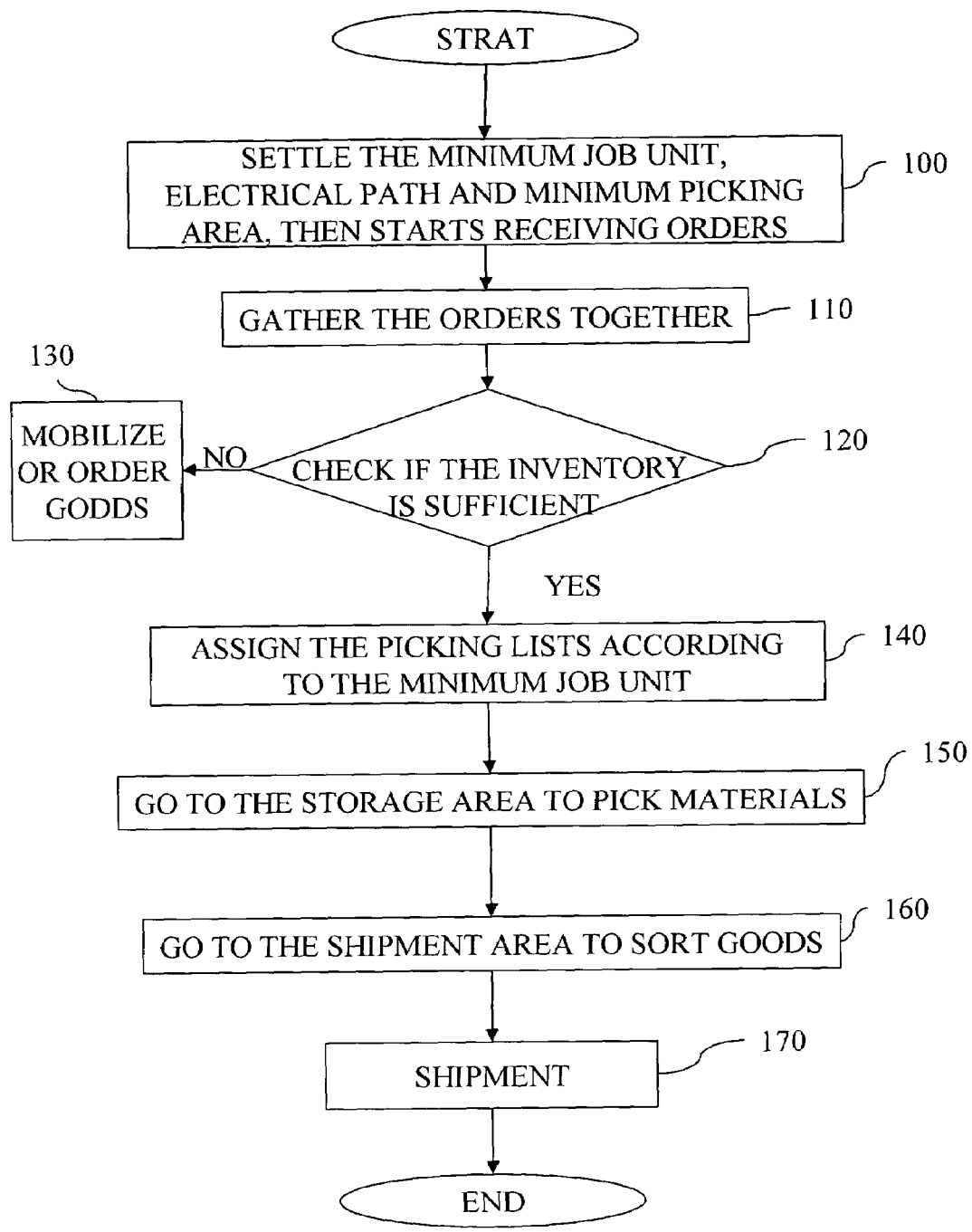
FIG. 1 shows a flow chart of the traditional materials picking operation.

A preferred embodiment of the method disclosed in the invention is illustrated as follows. Please refer to FIG. 1, which shows a flow chart of the traditional materials picking operation.

First, the system would settle a minimum job unit, define all the electrical paths and the minimum picking area, and then start to receive orders (Step 100). The warehouse staff would then gather the orders together, and check whether the inventory was sufficient (Step 120). If the inventory was insufficient, the warehouse staff would mobilize or order goods (Step 130). Otherwise, they would assign the picking lists according to the minimum job unit. The staff would then continue picking materials after receiving the picking lists (Step 150). After the materials picking operation was finished, the staff went to the shipment area to sort goods (Step 160), and then process shipment (Step 170).

Figure 2:
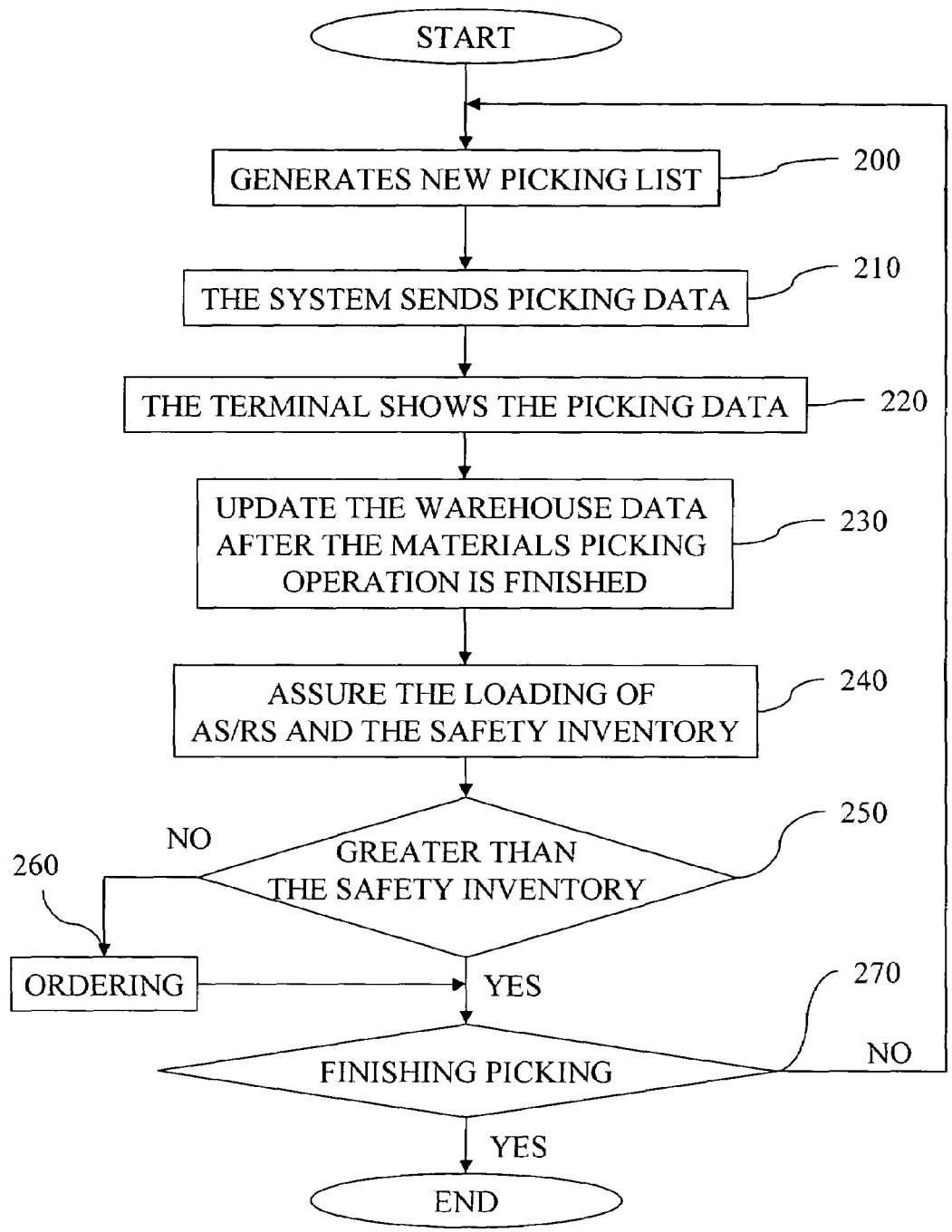
FIG. 2 shows a flow chart of the dynamic materials picking method disclosed in the invention.

Please refer to FIG. 2, which shows a flow chart of the dynamic materials picking method of the invention. The figure describes the whole process from picking list inputting to materials picking.

First, the system adopts an assignment mechanism to generate a new picking list (Step 200), and then sends the picking data (Step 210). The picking list then shows on the terminal (Step 220). The staff picks the materials according to the serial number of the goods and the picking data on the radio frequency terminal. After finishing the materials picking operation, the staff enters the result into the terminal, and then the terminal links to the warehouse system via a wireless network, and the system updates the warehouse data (Step 230). The staff checks the loading of AS/RS and the safety inventory (Step 240). If the quantity of the inventory is less than that of the safety inventory (Step 250), the staff orders new materials and goods (Step 260). If the quantity of the inventory is greater than that of the safety inventory and the materials picking is completed (Step 270), the system processes shipment after the goods or materials are sorted.

Figure 3:
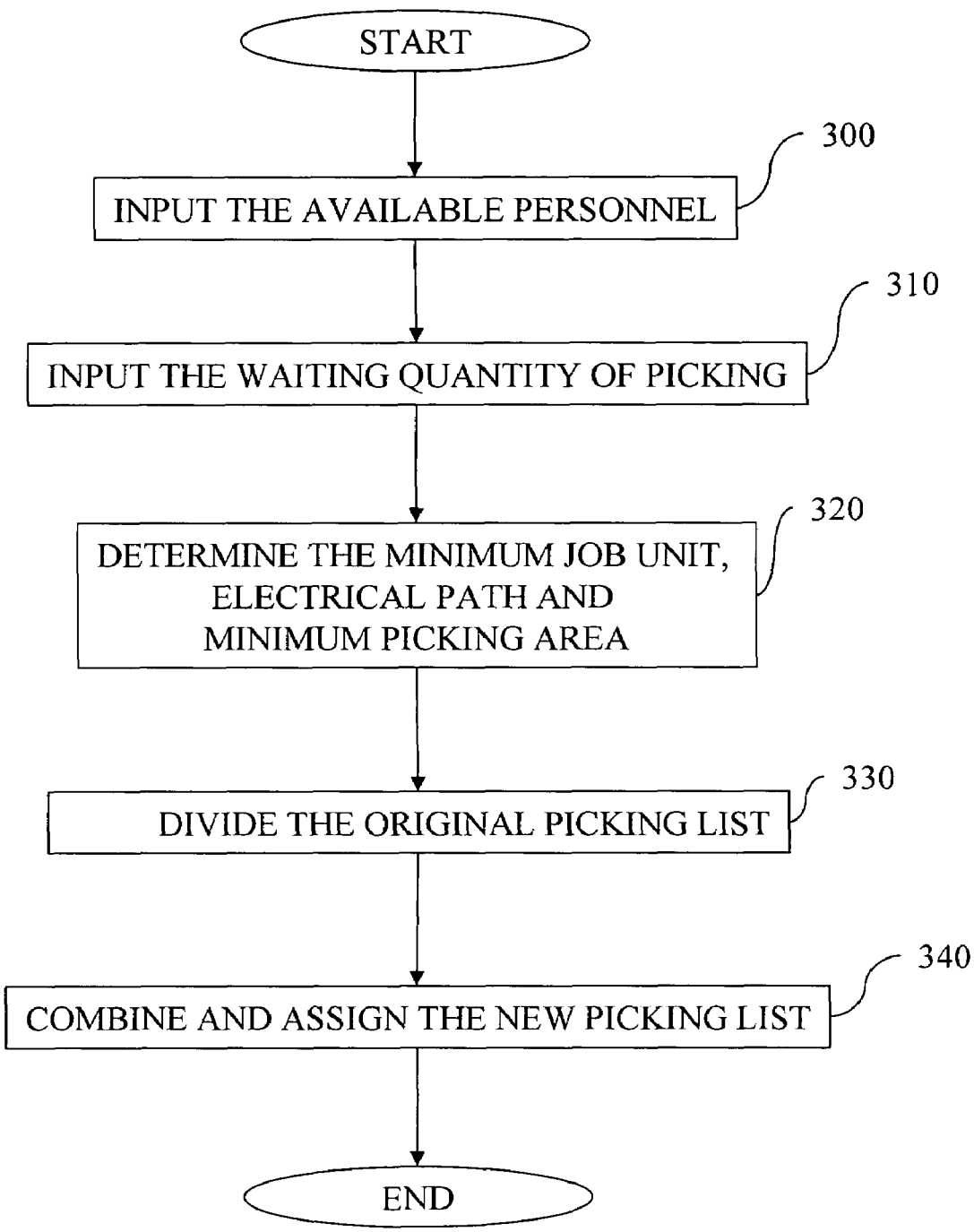
FIG. 3 shows a flow chart of generating a picking list of the dynamic materials picking method disclosed in the invention.

Now refer to FIG. 3, which shows the process of generating a picking list of the dynamic materials picking method disclosed in the invention, for illustrating the assigning mechanism in detail.

The method disclosed in the invention is achieved by dividing the original picking list into sub picking lists. Then the sub picking lists are delivered to different picking staff such that the picking operation is performed simultaneously. The method fastens the picking operation. Before dividing the original picking list, the available personnel and the waiting quantity of picking are first input (Step 300 and Step 310). Then the minimum job unit, the electrical path and the minimum picking area are also determined (Step 320). The number of sub picking lists is dependent on the quantity receiving strategy of the distribution center. After the above-mentioned conditions are all set, the original picking list is divided (Step 330). The sub picking lists are combined to a new picking list and the new picking list is re-assigned (Step 340). The orders are gathered as one group and are summed according to the commodity classification or the clients. Finally, the warehouse system processes the picking operation.

Compared with the traditional picking method, the dynamic materials picking method of the invention is more flexible, so the production capacity can be temporarily adjusted together with the automated warehouse information system. The method of the invention is suitable for diversified orders, various quantities of orders, and more complicated distribution centers.

There are many advantages of the dynamic materials picking method of the invention, which are summarized as follows:

1. optimizing staff usage.
2. averaging the loading of the picking staff.
3. improving materials picking efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamic material picking method for generating a new picking list, comprising the following steps:
   inputting the available personnel;
   inputting the waiting quantity of picking;
   determining a minimum job unit, an electrical path and a minimum picking area;
   dividing an original picking list into sub picking lists;
   combining the sub picking lists into a new picking list and assigning the new picking list.

2. The method of claim 1, wherein the new picking list is calculated by the available personnel, the waiting quantity of picking, the electrical path, the minimum job unit, and the minimum picking area.

3. The method of claim 1, wherein the original picking list is an original order.

* * * * *